United States Patent
Zimmerman et al.

(10) Patent No.: US 11,630,592 B2
(45) Date of Patent: Apr. 18, 2023

(54) DATA STORAGE DEVICE DATABASE MANAGEMENT ARCHITECTURE

(71) Applicant: Western Digital Technologies, Inc., San Jose, CA (US)

(72) Inventors: Israel Zimmerman, Ashdod (IL); Eyal Hakoun, Gesher Haziv (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 70 days.

(21) Appl. No.: 17/181,902

(22) Filed: Feb. 22, 2021

(65) Prior Publication Data

US 2022/0147249 A1 May 12, 2022

Related U.S. Application Data

(60) Provisional application No. 63/113,092, filed on Nov. 12, 2020.

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0679* (2013.01); *G06F 12/0292* (2013.01)

(58) Field of Classification Search
CPC ...... G06F 3/064; G06F 3/0604; G06F 3/0679; G06F 16/2282; G06F 16/252
See application file for complete search history.

(56) References Cited

U.S. PATENT DOCUMENTS

| | | | | |
|---|---|---|---|---|
| 7,818,493 | B2 * | 10/2010 | Traister | G06F 12/0246 711/103 |
| 8,898,410 | B1 * | 11/2014 | Ehrenberg | G06F 12/0246 711/E12.009 |
| 8,924,629 | B1 * | 12/2014 | Call | G06F 12/0246 711/103 |
| 2007/0156998 | A1 * | 7/2007 | Gorobets | G06F 12/0246 711/170 |
| 2008/0235306 | A1 * | 9/2008 | Kim | G06F 12/0246 |
| 2011/0072198 | A1 * | 3/2011 | Reiter | G06F 3/00 711/E12.001 |
| 2015/0234756 | A1 * | 8/2015 | Tuers | G06F 13/18 710/308 |
| 2016/0092325 | A1 * | 3/2016 | Bar | G06F 3/0619 714/6.1 |
| 2017/0286286 | A1 * | 10/2017 | Szubbocsev | G06F 12/0246 |
| 2018/0004652 | A1 * | 1/2018 | Battaje | G06F 12/0862 |
| 2022/0283995 | A1 * | 9/2022 | Hakami | G06F 16/24564 |

* cited by examiner

*Primary Examiner* — Francisco A Grullon
(74) *Attorney, Agent, or Firm* — Patterson + Sheridan, LLP; Steven H. VerSteeg (57) ABSTRACT

A method and apparatus for a database management architecture on an SSD. A list of tables is stored in the SSD, and records of a table are stored across multiple FIMs of the SSD such that a group of records may be read in parallel by concurrently reading from multiple FIMs. The records of the table are stored on jumboblocks, organized in an unordered fashion as a linked list. New records are added to the end of the linked list. Records having gaps resulting from data modification or bad portions of an NVM die are re-organized via garbage collection when the gap memory size reaches about 20% of table memory size.

20 Claims, 6 Drawing Sheets

DATA STORAGE DEVICE DATABASE MANAGEMENT ARCHITECTURE

CROSS-REFERENCE TO RELATED APPLICATIONS

This application claims benefit of U.S. provisional patent application Ser. No. 63/113,092, filed Nov. 12, 2020, which is herein incorporated by reference.

BACKGROUND OF THE DISCLOSURE

Field of the Disclosure

Embodiments of the present disclosure generally relate to the storing of data within a database management architecture of a data storage device.

Description of the Related Art

Databases are typically implemented on host systems, comprising dedicated processors, memory, and storage. When carrying out database file operations, such as writing a record to a table, deleting a record, modifying a record, or select on a table, an application typically provides instructions to the host system, that, in turn, call data from storage, load the table (and its records) in RAM and perform the requested operation. The result is provided to the application, and any changes to a record or table are written to storage as needed.

Developers have not typically sought to implement database operations on data storage devices. These devices are capable of storing large amounts of data and can be scaled with processing power and fast local memories. However, the effort required for architecting a database file management system to operate on a typical data storage device would be extremely resource intensive and require years of developer-hours. In addition, architecting a data storage device in a generalized fashion to manage SQL and non-SQL databases would be similarly resource and time intensive to develop.

What is needed are systems and methods to overcome the shortcomings of prior approaches, to manage and perform database operations, for SQL and non-SQL databases, in a data storage device.

SUMMARY OF THE DISCLOSURE

The present disclosure generally relates to a method and apparatus for a database management architecture on an SSD. A list of tables is stored in the SSD, and records of a table are stored across multiple FIMs of the SSD such that a groups of records may be read in parallel by concurrently reading from multiple FIMs. The records of the table are stored on jumboblocks, organized in an unordered fashion as a linked list. New records are added to the end of the linked list. Records having gaps resulting from data modification of bad portions of an NVM die are re-organized via garbage collection when the gap memory size reaches about 20% of table memory size. Gaps are defined as missing data.

In one embodiment, a data storage device is disclosed that includes a front-end (FE), a front-end module (FM) comprising a plurality of flash interface modules (FIMs), a table list and a jumboblock list, the FM coupled to the FE, and a controller comprising a processor configured to perform a method for database record management. In embodiments, the method includes writing a first record of a table to a first location on a first FIM of the plurality of FIMs, writing a second record of the table to second location of a second FIM of the plurality of FIMS, updating a first entry of the jumboblock list with the first location and a second entry of the jumboblock list with the second location, and updating the table list with a reference to the first location of the jumboblock list.

In another embodiment, a controller for a data storage device is disclosed, that includes an I/O to one or more memory devices, and a processor configured to execute a method for database record management. In embodiments the method includes storing a first reference to a first memory location of a first flash interface module (FIM), storing a second reference to a second memory location of a second FIM, wherein the first reference is coupled to the second reference, receiving an indication that data at one of the first memory location and second memory location has been modified, creating a gap in data, and storing a first gap reference to the gap in data.

In another embodiment, a system for storing data is disclosed that includes a front-end (FE) means, a front-end module (FM) means comprising a table list and an available blocks list, and a data block list, the available blocks list comprising a plurality of reference means to a plurality of locations on one or more flash interface modules (FIMs), and a controller means configured to perform a method for database record management. The method includes receiving a table comprising records, updating the table list to reference the table, receiving a plurality of records from the table, updating a FIM with data from a record of the plurality of records, and updating the data block list to include a reference to a memory location on the FIM comprising the data from the record.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a method and apparatus for a database management architecture on an SSD. A list of tables is stored in the SSD, and records of a table are stored across multiple FIMs of the SSD such that a groups of records may be read in parallel by concurrently reading from multiple FIMs. The records of the table are stored on jumboblocks, organized in an unordered fashion as a linked list. The term jumboblock is defined as a grouping of several flash blocks together. The term block and jumboblock may be used interchangeably herein. New records are added to the end of the linked list. Records having gaps resulting from data modification of bad portions of an NVM die are re-organized via garbage collection when the gap memory size reaches about 20% of table memory size.

Figure 1:
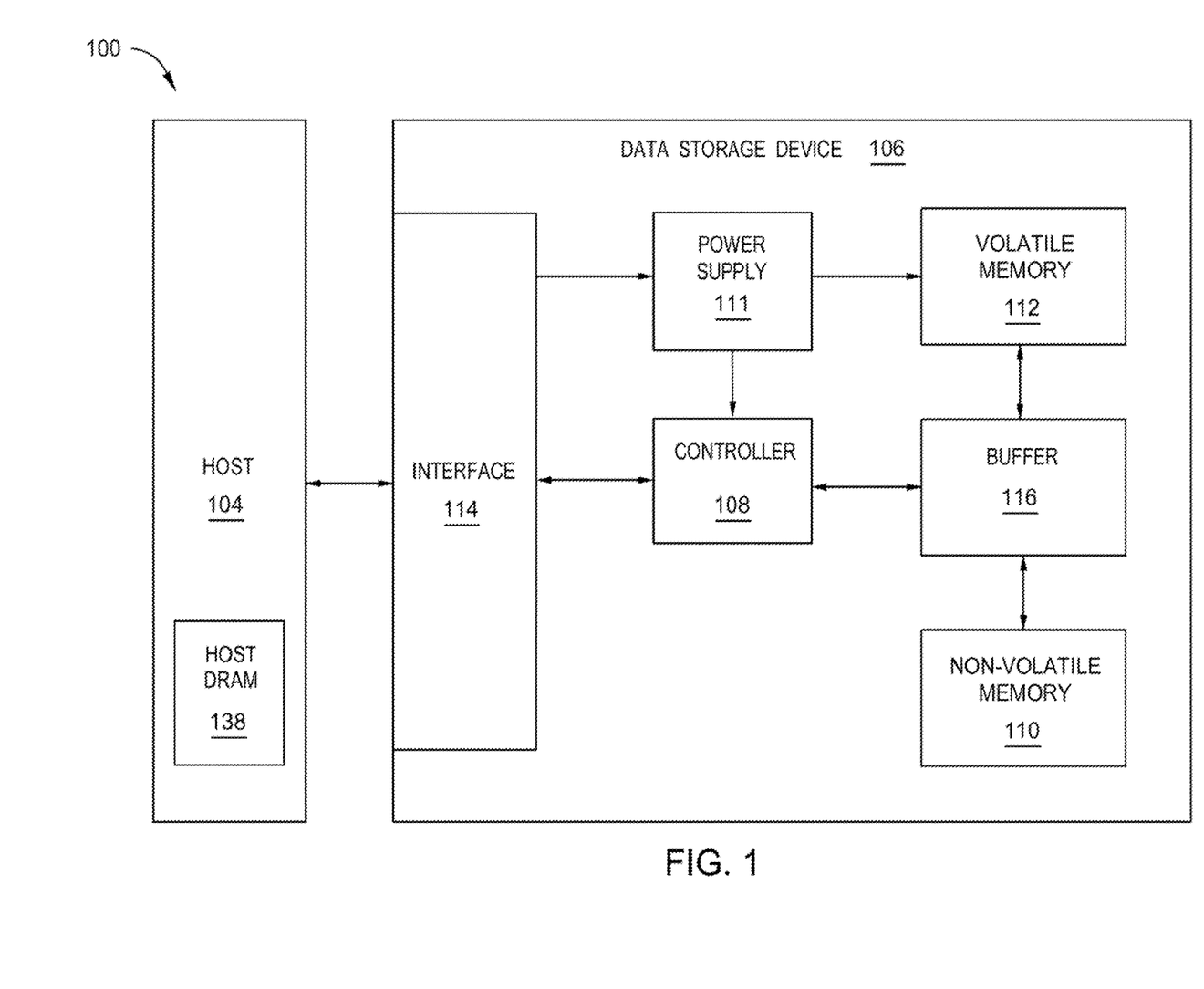
FIG. 1 is a schematic block diagram illustrating a storage system in which a data storage device may function as the data storage device for a host device, according to disclosed embodiments.

FIG. 1 is a schematic block diagram illustrating a storage system 100 in which data storage device 106 may function as a storage device for a host device 104, according to disclosed embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104, which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
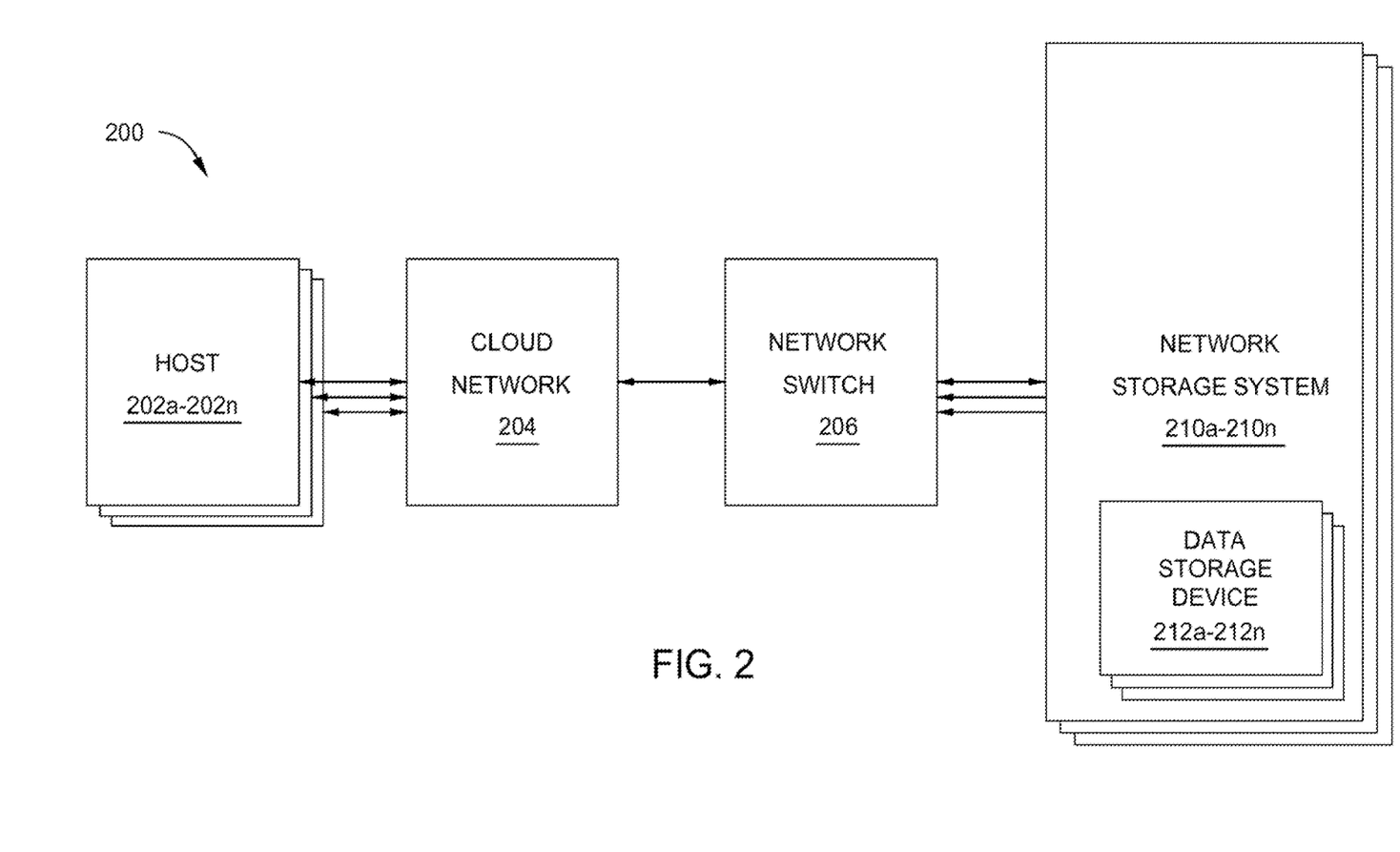
FIG. 2 is a schematic block diagram illustrating a database server system according to disclosed embodiments.

FIG. 2 is a schematic block diagram illustrating a database server system 200, according to disclosed embodiments. The database server system includes one or more host devices 202a-202n, where each of the one or more host devices 202a-202n may be the host device 104 of FIG. 1, a cloud network 204, a network switch 206, and one or more network storage systems 210a-210n. Each of the network storage systems 210a-210n includes one or more data storage devices 212a-212n, where each of the one or more data storage devices 212a-212n may be the data storage device 106 of FIG. 1 or 304 of FIG. 3, discussed below.

The one or more host devices 202a-202n may be connected to the cloud network 204 via methods of network data transfer, such as Ethernet, Wi-Fi, and the like. The cloud network 204 is connected to the network switch 206 via methods of network data transfer, such as Ethernet, Wi-Fi, and the like. The network switch 206 may parse the incoming and outgoing data to the relevant location. The network switch 206 is coupled to the one or more network storage systems 210a-210n. The data from the one or more host devices 202a-202n are stored in at least one of the one or more data storage devices 212a-212n of the one or more network storage devices 210a-210n.

For example, the one or more network storage systems may be configured to further parse incoming data to the respective one or more data storage devices 212a-212n as well as retrieve data stored at the respective one or more data storage devices 212a-212n to be sent to the one or more host devices 202a-202n. The one or more host devices 202a-202n may be configured to upload and/or download data via the cloud network 204, where the data is uploaded and/or stored to at least one of the one or more data storage devices 212a-212n of the one or more network storage systems 210a-210n. It is to be understood that "n" refers to a maximum number of described components of the database server system 200. For example, the one or more data storage devices 212a-212n may be about 1 data storage device, about 2 data storage devices, or any number greater than about 2 data storage devices.

Figure 3:
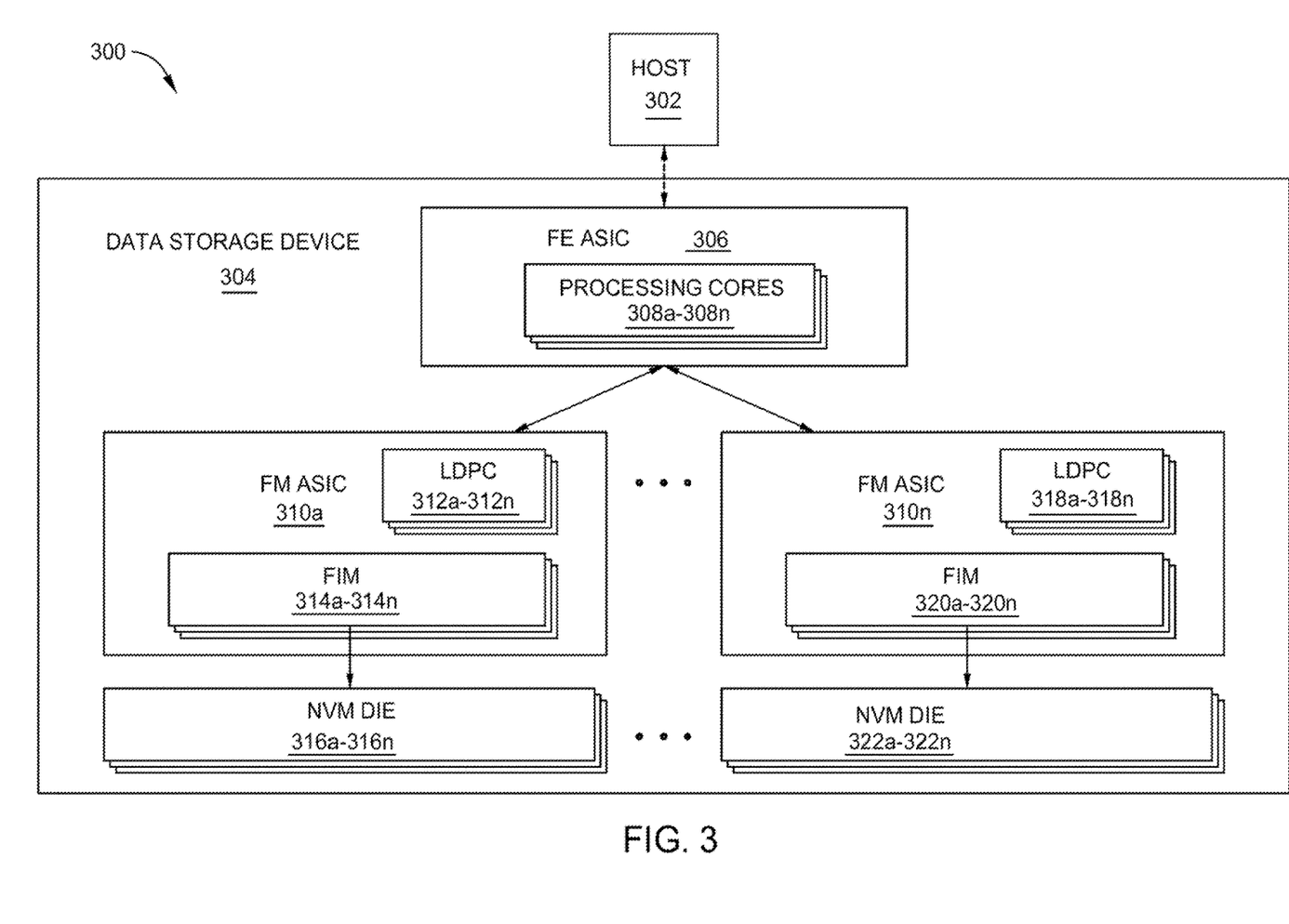
FIG. 3 is a schematic block diagram illustrating an improved data storage device, according to disclosed embodiments.

FIG. 3 is a schematic block diagram of a storage system 300 illustrating an improved data storage device 304, according to disclosed embodiments. The storage system 300 may be the database server system 200 of FIG. 1. For example, the data storage device 304 may be implemented as one or more data storage devices 212a-212n of the one or more network storage systems 210a-210n, and the host device 302 may be implemented as the one or more host devices 202a-202n of FIG. 2. It is to be understood that the data storage device 304 may include additional components not shown in FIG. 3 for the sake of clarity. In one embodiment, the data storage device 304 may be an E1.L enterprise and data SSD form factor (EDSFF).

The data storage device 304 includes a front-end (FE) application-specific integrated circuit (ASIC) 306, a first front-end module (FM) ASIC 310a, and an nth FM ASIC 310n. In the embodiments described herein, the "n" refers to a maximum number of described components of the data storage system 304. For example, the data storage device 304 may include about 10 FM ASICs, where the nth or "n" number of FM ASICs is equal to about 10. The data storage device 304 further includes one or more NVM dies 316a-

316n, 322a-322n. Furthermore, the data storage device 304 may include a plurality of FM ASICs (indicated by the ellipses), where each of the FM ASICs of the plurality of FM ASICs is coupled to a respective NVM die of the plurality of NVM dies 316a-316n, 322a-322n. It is to be understood that while a plurality of FM ASICs and a plurality of NVM dies coupled to each of the FM ASICs of the plurality of FM ASICs are described, and the data storage device 304 may include a single FM ASIC coupled to a single NVM die or a single FM ASIC coupled to a plurality of NVM dies. In one embodiment, the NVM is NAND memory, where each of the plurality of NVM dies are NAND dies. In one embodiment, the plurality of NVM dies 316a-316n, 322a-322n of the data storage device 304 are bit cost scalable (BiCS) 6 NVM dies. The BiCS 6 NVM dies may have improved operating speeds, and lower power consumption than previous versions such as BiCS 5 NVM dies.

The plurality of FM ASICs 310a-310n each comprise a plurality of low-density parity-check (LDPC) engines 312a-312n, 318a-318n and a plurality of flash interface modules (FIMs) 314a-314n, 320a-320n. Each of the plurality of FIMs 314a-314n, 320a-320n are coupled to a respective NVM die of the plurality of NVM dies 316a-316n, 322a-322n. In one embodiment, each FIM is coupled to a respective NVM die. In another embodiment, each FIM is coupled to a respective about four NVM dies. The plurality of LDPC engines 312a-312n, 318a-318n, may be configured to generate LDPC codes or parity data. The LDPC codes and the parity data may be attached to the respective incoming data to be written to the respective NVM die of the plurality of NVM dies 316a-316n, 322a-322n. In one embodiment, the FM ASIC includes about 14 LDPC engines. In another embodiment, the FM ASIC includes less than about 54 LDPC engines.

The LDPC codes and the parity data may be utilized to find and fix erroneous bits from the read and write process to the plurality of NVM dies 316a-316n, 322a-322n. In one embodiment, a high failed bit count (FBC) corresponds to an error correction code (ECC) or parity data size of about 10.0%. In another embodiment, a low FBC corresponds to the ECC or parity data size of about 33.3%. When the ECC or parity data size is increased from about 10.0% to about 33.3%, the FBC decreases as the data includes more capability to find and fix failed or erroneous bits. In another embodiment, each NVM die of the plurality of NVM dies 316a-316n, 322a-322n includes between about 10.0% and about 33.3% of ECC or parity data associated with the respective stored data. Furthermore, each NVM die of the plurality of NVM dies 316a-316n, 322a-322n may have a bit error rate (BER) of about 0.2 or less than about 0.2. By including more ECC or parity data with the respective data stored in the NVM dies 316a-316n, 322a-322n, the BER may be decreased or improved, such that the BER has a value closer to about 0. The table below describes a power consumption and read performance improvement by increasing the amount of ECC or parity data to be stored on each NVM die of the plurality of NVM dies 316a-316n, 322a-322n.

TABLE 1

|  | FBC High (ECC size ~=10.0%) | FBC Low (ECC size ~=33.3%) |
| --- | --- | --- |
| Read Performance (GB/s) | 1.2 | 4.7 |
| Power Consumption (Watt) | 0.200 | 0.120 |
| NVM Die Per FM | 27 | 7 |

TABLE 1-continued

|  | FBC High (ECC size ~=10.0%) | FBC Low (ECC size ~=33.3%) |
| --- | --- | --- |
| Total Data Storage Device Capacity (TB) | 5.56 | 4.69 |
| Total Power Consumption (W) | 29.348 | 24.832 |

The listed values in Table 1 are not intended to be limiting, but to provide an example of a possible embodiment. Though the total data storage device capacity is lower when the ECC or parity data size is about 33.3% (i.e., FBC low) than when the ECC or parity data size is about 10.0% (i.e., FBC high), the read performance is increased from about 1.2 GB/s to about 4.8 GB/s, and the power consumption decreases from about 0.200 Watt (using about 10.0% parity size, or high BER engine) to about 0.120 Watt (using about 33.3% parity size, or low BER engine). Thus, the data storage device 304 may have improved power consumption and read performance when the ECC or parity data size is greater.

The FE ASIC 306 includes a plurality reduced instruction set computer (RISC) processing cores 308a-308n. In the description herein, the RISC processing cores 308a-308n may be referred to as processing cores 308a-308n, for exemplary purposes. Although RISC processing cores are described, in embodiments other types of processing cores may be utilized, such as CISC, or other processor architecture. For example, the FE ASIC 306 may include a number of processing cores greater than about 5 processing cores. In another embodiment, the number of processing cores is about 256 processing cores and about 512 processing cores. Each of the plurality of processing cores 308a-308n is configured to receive and execute a database instruction from the host 302. The database instruction may include one of a select, an update, and an insert instruction. The database instruction may further include a delete instruction in addition to the previously mentioned instructions. Furthermore, when receiving a database instruction from the host 302, the FE ASIC 306 may allocate an appropriate number of processing cores of the plurality of processing cores 308a-308n to complete the requested database instructions.

Figure 4:
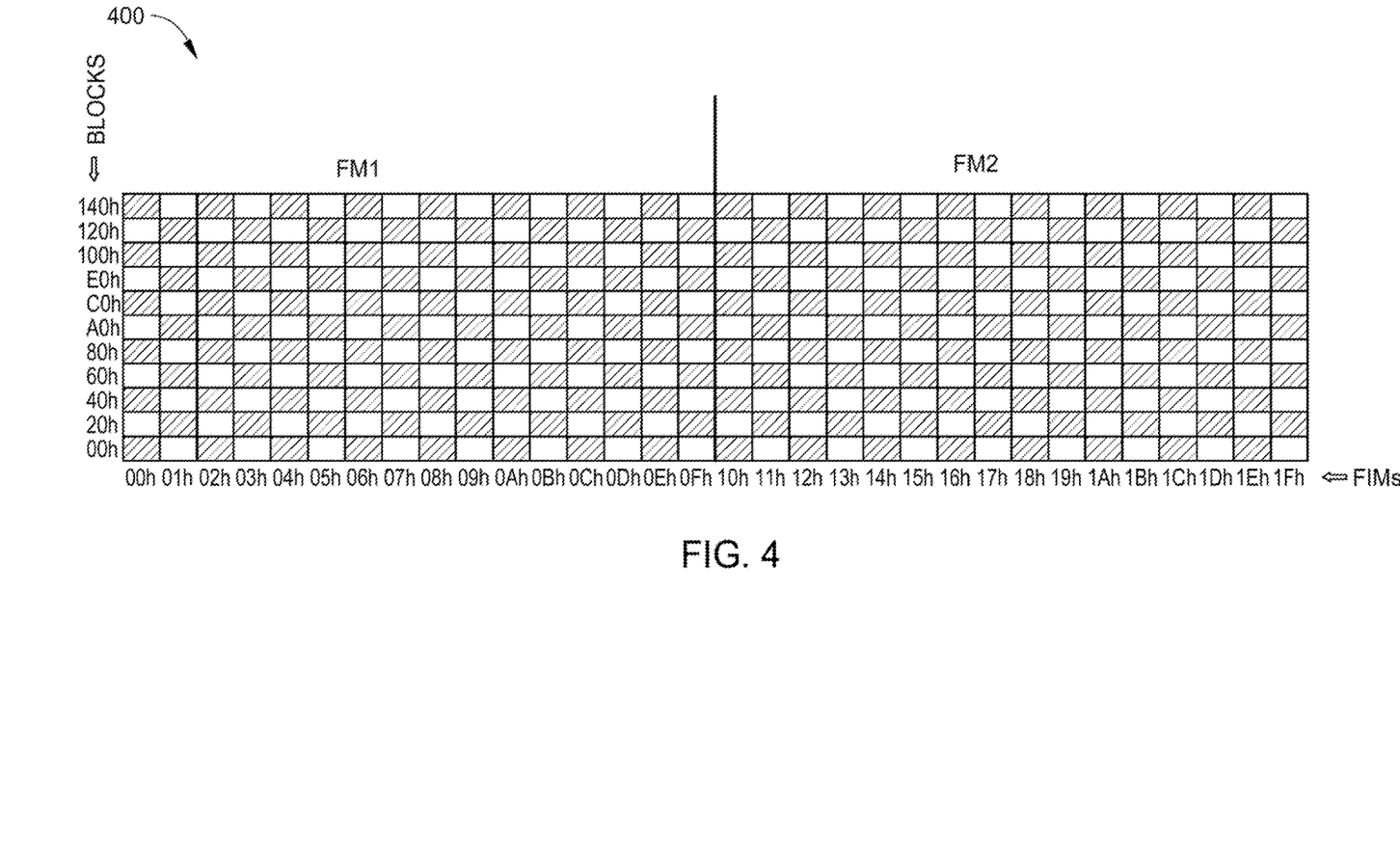
FIG. 4 is a schematic block diagram illustrating an internal flow of a database data storage device, according to disclosed embodiments.

FIG. 4 is a schematic block diagram illustrating a jumboblock array 400 of a database data storage device, according to disclosed embodiments, depicting physical organization of jumboblocks across one or more NVM dies. The jumboblock array includes a FM1 and FM2, where the FM1 and FM2 may be at least one of the FM ASICs of the plurality of FM ASICs 310a-310n of FIG. 3. Each FM may include an even number of FIMs allocated to each FM. For example, 32 FIMs are illustrated in the current embodiment. The FM1 includes a plurality of FIMs (listed as 00h, 01h, 02h, 03h, 04h, 05h, 06h, 07h, 08h, 09h, 0Ah, 0Bh, 0Ch, 0Dh, 0Eh, and 0Fh), each including a plurality of jumboblocks (listed as 00h, 20h, 40h, 60h, 80h, A0h, C0h, E0h, 100h, 120h, and 140h). Similarly, the first 16 FIMs are allocated to the FM1 and the second 16 FIMs are allocated to the FM2. The FM2 includes a plurality of FIMs (listed as 10h, 11h, 12h, 13h, 14h, 15h, 16h, 17h, 18h, 19h, 1Ah, 1Bh, 1Ch, 1Dh, 1Eh, and 1Fh), each including a plurality of jumboblocks (listed as 00h, 20h, 40h, 60h, 80h, A0h, C0h, E0h, 100h, 120h, and 140h). It is to be understood that the number of FMs, FIMs, and jumboblocks illustrated is not intended to be limiting, but to provide an example of a possible embodiment.

Each jumboblock of the plurality of jumboblocks may have a size of about 384 KB for holding a table entry or record, and a jumboblock may be defined to be of different a size suitable for storing elements of a table. Furthermore, a certain amount of space of the jumboblock may be used for parity data. For example, for a parity data size of about 33%, the remaining space for data is about 288 KB. It is to be understood that other parity data sizes are contemplated, such as about 10%, and are applicable for the embodiments described herein. For a FM, such as the FM1, each jumboblock of the plurality of jumboblocks for each FIM of the plurality of FIMs is an individual unit of a jumboblock array. For example, the jumboblock 00h of the FIM 00h may be the first unit of the jumboblock array of the FM1 and the jumboblock 140h of the FIM 0Fh may be the last unit of the jumboblock array of the FM1. An address of the first unit of the jumboblock array of the FM1 may be (00h, 00h) and an address of the last unit of the jumboblock array of the FM1 may be (0Fh, 140h).

Furthermore, when programming to the jumboblock array, data, for example of table records, may be programmed sequentially to each jumboblock of the jumboblock array. For example, a sequential program may occur on the same jumboblock of adjacent FIMs of the FM or on the same jumboblocks of different FMs. For example, a sequential program in the same FM may occur to the 00h jumboblock of the 00h FIM and the 00h jumboblock of the 01h FIM. In another example, a sequential program on the same jumboblock of different FMs may occur to the 00h jumboblock of the 00h FIM of the FM1 and the 00h jumboblock of the 00h FIM of the FM2. It is to be understood that while the examples described are related to sequential programming within the same data storage device, sequential programming may occur in parallel between two or more data storage devices within a single system or across a computational storage system.

Records may be programmed to each of the jumboblocks in size of up to about 64 KB. Each record may be an entry of a database table, where a record includes one or more fields of data. For example, a record may include a "name" field, a "phone number" field, an "email" field, and a "birth date" field. Each of the records may further include a hierarchy structure, where one or more related records may be aggregated into a single record. Each of the records may be stored in a database table according to a schema structure in one or more jumboblocks.

Figure 5:
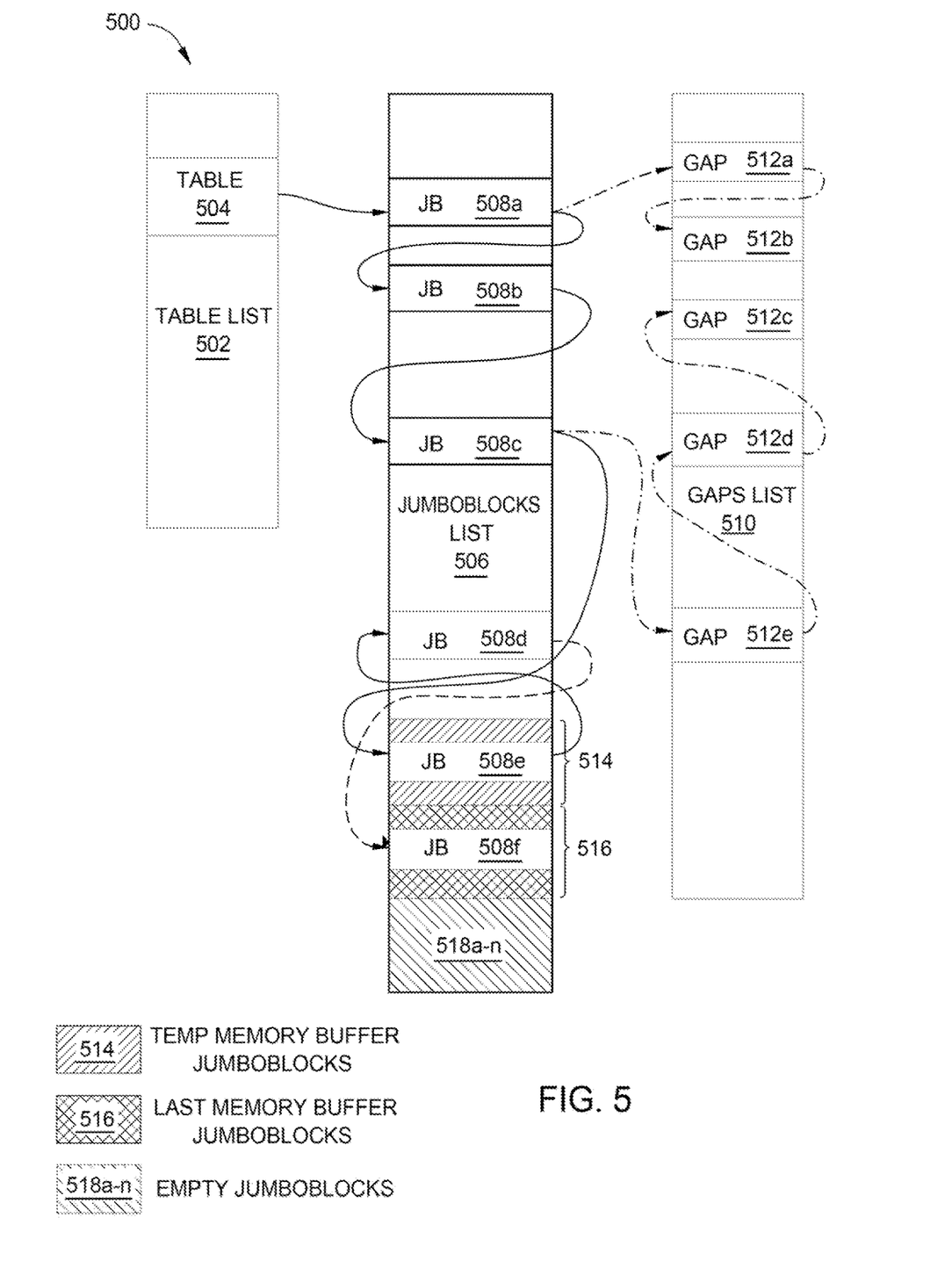
FIG. 5 is a schematic block diagram illustrating a jumboblock array of a database data storage device, according to disclosed embodiments.

FIG. 5 is a schematic block diagram illustrating an internal flow 500 of a database data storage device, according to disclosed embodiments, depicting a logical organization of jumboblocks. The internal flow 500 may describe a linked list connecting sequential jumboblocks of various FIMs, FMs, or data storage devices to each other. In some embodiments, a linked list may allow for non-sequential jumboblocks to be read and accessed sequentially. A linked list is a linear data structure where each element is a separate object that contains a reference to the next object, typically via by providing an address (a.k.a., a "pointer") for the next object. An example of a linked list is a singly linked list, where each element points to the next element. For example, each jumboblock may be an individual element and each element includes the data and a reference. The reference points to the next jumboblock or element. An entry point into a linked list is referred to as a head and the last element of the linked list is referred to as a null. For example, three jumboblocks, A, B, and C, are written to a database table. The head may be the jumboblock A, where A includes a reference to jumboblock B and jumboblock B includes a reference to jumboblock C. Because jumboblock C is the last jumboblock in the singly linked list, the reference of jumboblock C points to null.

It is to be understood that the embodiments described herein are not limited to singly linked lists, and other embodiments, such as a doubly linked list, a multiply linked list, a circular linked list, an array, and the like are also contemplated and applicable to the embodiments described herein.

The internal flow 500 may be part of a flash translation layer (FTL) to manage and keep track of the data of the database data storage device. The internal flow 500 includes a table list 502 that includes a plurality of tables (table 504 out of the plurality of tables shown for exemplary purposes), a jumboblocks list 506 that includes a plurality of jumboblocks (JB) 508a-508f, and a gaps list 510 that includes a plurality of gaps 512a-512e. The illustrated number of elements of the table list 502, the jumboblocks list 506, and the gaps list 510 is not intended to be limiting, but to provide an example of a possible embodiment. In one embodiment, the maximum number of tables in the table list 502 may be about 256 tables. The table list 502 may be stored in the FM, such as the FM ASIC 310a-310n of FIG. 3, where the FM ASIC is configured to sequentially read the data by removing any gaps in the data. The sequential read may be completed using a linked list. The gaps list 510 includes any deleted data on the plurality of jumboblocks and the bad blocks of the plurality jumboblocks, where the bad blocks may have an unacceptable bit error rate as an example.

Furthermore, the jumboblocks list 506 may have a first portion, a second portion corresponding to a temporary memory buffer jumboblocks sections 514, a third portion corresponding to a last memory buffer jumboblocks section 516, and a fourth portion corresponding to an empty jumboblocks section 518a-n, where each section of the empty jumbobocks section 518a-n corresponds to a FIM of the plurality of FIMs and where "n" refers to the number of FIMs. The last memory buffer jumboblocks section 516 includes jumboblocks to be filled prior to programming additional jumboblocks to the NVM, such as the NVM 110 of FIG. 1. The temporary memory buffer jumboblocks section 514 includes jumboblocks that are copied from the NVM to be modified or rewritten to another section of the NVM due to a data storage device operation such as garbage collection. The last memory buffer jumboblocks section 516 and the temporary memory buffer jumboblocks section 514 may be internal memory buffers of the data storage device, such as the data storage device 106 of FIG. 1. The internal memory buffers may be stored in a random access memory (RAM), such as static random access memory (SRAM) or dynamic random access memory (DRAM).

The empty jumboblocks section 518a-n includes not yet written to or previously erased jumboblocks for each FIM. The empty jumboblocks section 518a-n may include about 32 entries per FIM. For example, a first FIM may have a first empty jumboblocks section 518a that includes about 32 entries or about 32 empty jumboblocks, limited only by the size of an NVM die coupled to the FIM. The previously listed value is not intended to be limiting, but to provide an example of a possible embodiment. For example, each FIM described in FIG. 4 may include may have about 32 empty jumboblocks.

However, when programming to an empty jumboblock, the controller, such as the controller 108 of FIG. 1, and/or the processors, such as the processing cores 308a-308n, may be configured to appropriate, for example by providing a pointer to an empty jumboblock that satisfies or maintains a sequential read parallelism in the FIMs. In embodiments, the empty jumboblock pointer for the first FIM may point to the next available jumboblock, such as the first empty jumboblock in the first empty jumboblocks section 518a for a program to the first FIM. For example, a first pointer from the last programmed entry of the relevant FIM points to the first empty erased jumboblock, so as to keep a sequential read order of the FIMs intact to enable read parallelism across the FIMs. In embodiments, the empty block pointer will reference the next available jumboblock in a First-In-First-Out (FIFO) manner, in order to maintain read parallelism across the FIMS. In another embodiment, the first empty erased jumboblock may be a jumboblock that has the longest period since being erased or may be a jumboblock not yet programmed to. Each time that the first empty jumboblock of a section of the empty jumboblocks section 518a-518n is programmed to, the first pointer is updated to point to the next empty jumboblock of the relevant section.

When a jumboblock is erased during a data storage device operation, such as garbage collection when the data associated with the gaps 512a-512b is greater exceeds about 20% of the total jumboblocks, the erased jumboblock may re-allocated to the relevant empty jumboblock section, according to the FIM, of the empty jumboblocks section 518a-n, and referenced by the empty jumboblock pointer in the FIFO manner indicated above to maintain read parallelism across multiple fims, as well as to increase jumboblock endurance. Although in the described embodiment empty jumboblocks are provided to a FIM from the FIM's empty jumboblock queue in a FIFO manner, one of skill in the art may provide empty jumboblocks in a different order.

When the gaps list 510 is empty, such as when no bad blocks or deleted data exists, the first entry of the gaps list 510 includes a linked list of empty gap entries. However, as the gaps list 510 starts to fill, such as with a first gap 512a and a second gap 512b, the linked list may link the first gap 512a to the second gap 512b. Furthermore, if two gaps are adjacent to each other, then the two gaps may be merged to one gap that includes the data from the two gaps.

The controller and/or processors may be configured to write a first record of a first table 504 to a first location on the first FIM of the plurality of FIMs and a second record of the table 504 is written to a second FIM of the plurality of FIMs. The controller and/or processors are configured to update a first entry, such as the first JB 508a, with the first location and a second entry, such as the second JB 508b, with the second location. The first entry may include a first reference to the second entry, where the first reference points to the location of the second entry. The table 504 in the table list 502 is updated with a reference to the first location of the jumboblocks list 506. The first location and the second location may be sequential block addresses of the first and the second FIM, such that reading the first record and the second record may be performed in parallel.

When a third record is received at the last memory buffer jumboblocks section 516, the controller and/or processors are configured to write the third record to a third location on a third FIM of the plurality of FIMs, where the third location is a sequential block address relative to the second location. In one embodiment, the third JB 508c may be provisioned from the empty jumboblocks section 518. In another embodiment, the third JB 508c may have been written to previously. The third entry, such as the third JB 508c, is updated with the location of the third record and the second entry is updated with a reference to the third entry. In one embodiment, the references, such as the first, the second, and the third references, may be stored in the relevant FIM of the plurality of FIMs.

When the controller and/or processors receive an indication that data at one of the first location and the second location has been modified, such that a gap in data is generated, the controller and/or processors are configured to store a first gap reference corresponding to the gap in data. For example, when the first JB 508a data is modified, a first gap 512a may be generated. When the first JB 508 is modified a second time, a second gap 512b may be generated. The gaps list 510 keeps track of the gaps. A first gap reference may be attached to the first JB 508a, where the first gap reference points to the first gap 512a. Similarly, the first gap 512a includes a second gap reference that points to the second gap 512b. When reading the first record, the controller and/or processors may be able to read the first record without referencing the first and/or the second gap 512a, 512b, such that the reading of the first record may be sequential and unbroken. The first record may be read in parallel with the second record and the third record due to the sequential write to the second and the third FIMs.

When the controller and/or processors receives a request for the first and the second reference, such as a read request, the data associated with the first and the second reference stored in the first and the second JB 508a, 508b is transferred to the controller and/or processors. In one embodiment, the data provided to the controller and/or processors does not include the data associated with the first gap 512a and/or the second gap 512b. When the data associated with the gaps 512a-512b overcomes a threshold value, such as about 20% of the total capacity of the jumboblocks or the array of jumboblocks, the database storage device may be configured to perform a data storage device operation, such as garbage collection. For example, when garbage collection occurs on the first JB 508a, the relevant data may be transferred to the temporary memory buffer jumboblocks section 514, such as to the JB 508e, while the data associated with the first gap 512a and the second gap 512 remains in the first JB 508a.

The controller and/or processors erase the first JB 508a and the first JB 508a is moved to the empty jumboblocks section 518. The relevant data transferred to the JB 508e is then committed to the jumboblocks list 506 in a fourth JB 508d. When the data associated with the fourth JB 508d is ready to be programmed to the relevant location in the NVM, the data or record associated with the fourth JB 508d is moved to a JB 508f of the last memory buffer jumboblocks 516. Each time the data or record is moved or modified the relevant references and lists 502, 506, 510 are updated.

In another example, a fourth record is programmed to a fourth JB 508d. Prior to programming the fourth record to the fourth JB, the fourth record data is written to a jumboblock of the temporary memory buffer jumboblocks secton 514, such as to the JB 508e. The third record is programmed with a link or a third reference to the fourth record. After the JB 508e is filled, the fourth record is programmed to the fourth JB 508d. When the fourth JB 508d is erased, such as due to garbage collection or other relevant data management operations, the fourth JB 508d is reappropriated to the relevant section of the empty jumboblocks section 518a-n. For example, the fourth JB 508d is associated with a first FIM. When erasing the fourth JB 508d, the fourth JB 508d is moved to the empty jumboblocks section that corresponds with the first FIM, such as a first empty jumboblocks section 518a, where the fourth JB 508d is the last jumboblock of the list of jumboblocks in the first empty jumboblocks section 518a. When writing back to the jumboblocks list 506 for the first FIM, the next record is programmed to the next empty jumboblock in the first empty jumboblocks section 518*a* corresponding to the first FIM, such as to keep a sequential order of the FIMs so as to maintain the ability to read data from the FIMs in parallel. A pointer of the third record (i.e., the last programmed record of the relevant FIM) may point to the first empty jumboblock of the first empty jumboblocks section 518*a* to indicate the next jumboblock to program to.

Figure 6:
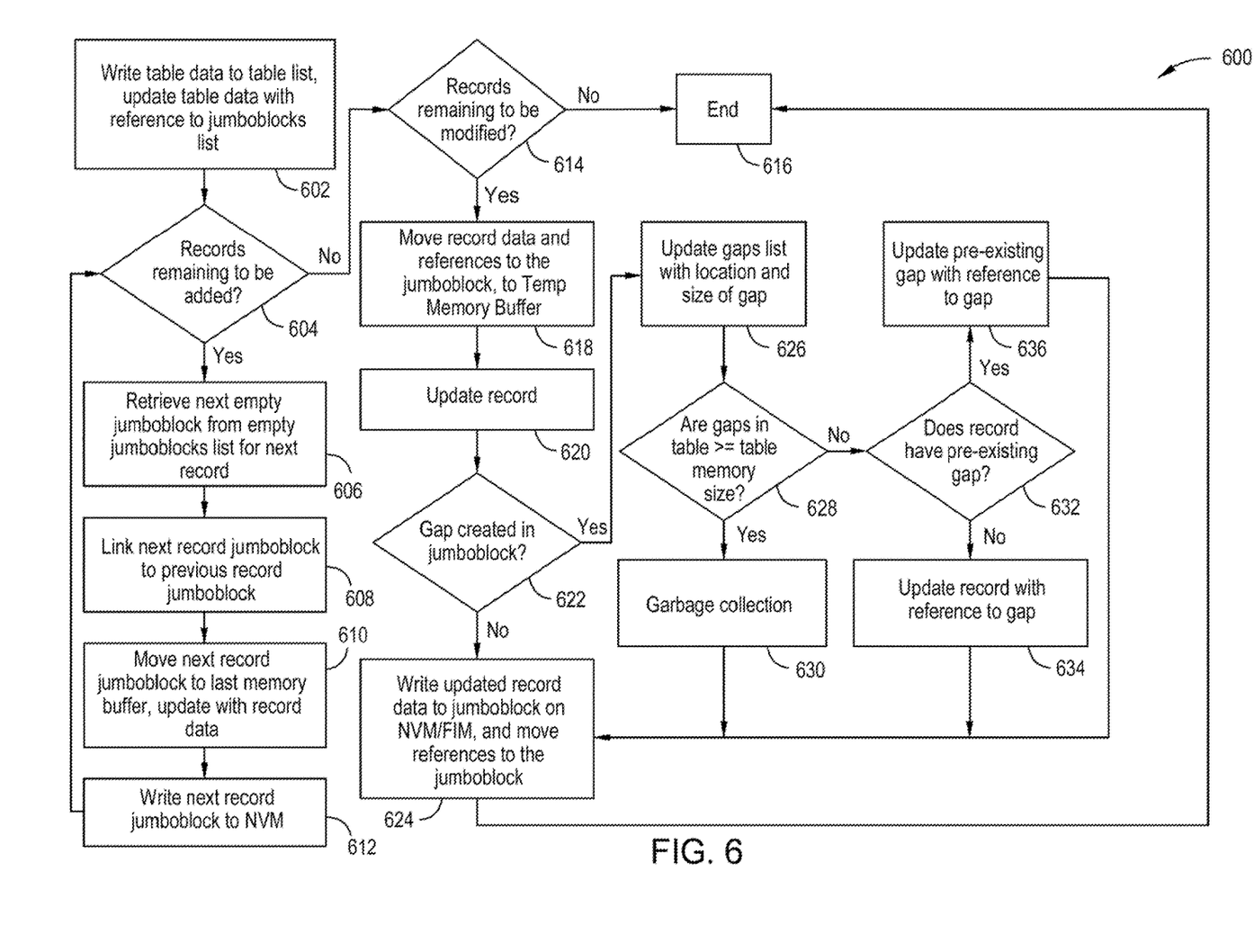
FIG. 6 is a flow diagram illustrating a method 600 of writing records to a jumboblock array and modifying records of a jumboblock array, according to disclosed embodiments.

FIG. 6 is a flow diagram illustrating a method 600 of writing records to a jumboblock array and modifying records of a jumboblock array, according to disclosed embodiments. Aspects of the internal flow 500 of FIG. 5 may be similar to the method 600. At block 602, table data, such as the table 504, is written to a table list, such as the table list 602, where the table data is updated with references to the jumboblocks list, such as the jumboblocks list 506. The table data may include a plurality of records. At block 604, the controller and/or processors are configured to determine if there are any additional records to remaining to be added or programmed to the NVM.

If there are remaining records to be added at block 604, then at block 606, the controller and/or processors are configured to retrieve the next empty jumboblock from the empty jumboblocks list, such as the empty jumboblocks list 518 of FIG. 5, for the next record (i.e., the next remaining record to be added). At block 608, the next empty jumboblock associated with the next record is linked to the previous record jumboblock. When linking the next empty jumboblock to the previous record jumboblock, a reference is written to the previous record jumboblock, where the reference points to the next empty jumboblock.

At block 610, the next empty jumboblock is moved to the last memory buffer, such as the last memory buffer jumboblocks section 516 of FIG. 5. The record data is programmed to the next empty jumboblock. At block 612, the next empty jumboblock is programmed to the relevant location in the NVM by a FIM of the plurality of FIMs. After completing the step at block 612, the method 600 returns to block 604.

If there are no more remaining records to be added at block 604, then at block 614, the controller and/or processors are configured to determine there are any records remaining to be modified. It is to be understood that the method 600 may alternatively go from block 602 to 614 before going to block 604, in some embodiments. If there are no remaining records to be modified at block 614, then the method 600 is completed at block 616.

However, if there are records remaining to be modified at block 614, then the controller and/or processors may generate a command to move record data and references to the temporary memory buffer, such as the temporary memory buffer jumboblocks section 514, at block 618. The FM ASIC and/or the relevant FIM may be configured to execute the command generated by the controller and/or processors. At block 620, the record is updated with the relevant information. At block 622, the controller and/or processors determines if a gap has been created in the jumboblock, such as when data is deleted or modified. If no gaps have been created in the modified jumboblock, the controller and/or processors are configured to write updated record data to the jumboblock on the NVM, where the relevant location is based on the FIM location at block 624. Furthermore, the references are updated to reflect the new location of the jumboblock programmed at block 624. After completing the step at block 624, the method 600 is completed at block 616.

However, if there are gaps generated in the jumboblock at block 622, the gap entry in the gaps list, such as the gaps list 510 of FIG. 5, is updated with the location and the size of the gap at block 626. At block 628, the controller and/or processors determine if the gaps in the table are greater than or equal to a threshold value of the table memory size. In one embodiment, the threshold value may be about 20%. If the gaps are greater than or equal to the threshold value at block 628, then at block 630, a garbage collection operation is performed. For example, when the first gap reference and at least one additional gap reference is greater than or equal to about 20% of the table memory size, the controller and/or processor may generate a garbage collection command to reduce the gap size in the table memory. The method 600 continues to block 624. After completing the step at block 624, the method 600 is completed at block 616.

If the gaps are not greater than or equal to a threshold value of the table memory size at block 628, then the controller and/or processors determine if the record has a pre-existing gap at block 632. If there are no pre-existing gaps at block 632, then at block 634, the controller and/or processors update the relevant record with a reference to the gap. However, if the record has a pre-existing gap at block 632, then at block 636, the pre-existing gap is updated with a reference to the gap. In some embodiments, when the gap is adjacent to the pre-existing gap, the gap and the pre-existing gap may be combined such that a single gap is present in the table. After the step at block 634 and at 636, the method 600 continues to the step at block 624, where the method 600 is completed at block 616.

By storing records of a table across multiple FIMs of a database data storage device and utilizing a linked list to link non-sequential jumboblocks to each other, a group of records may be read in parallel by concurrently reading from multiple FIMs, thus improving operations of the database data storage device.

In one embodiment, a data storage device is disclose that includes a front-end (FE), a front-end module (FM) comprising a plurality of flash interface modules (FIMs), a table list and a jumboblock list, the FM coupled to the FE, and a controller comprising a processor configured to perform a method for database record management. In embodiments, the method includes writing a first record of a table to a first location on a first FIM of the plurality of FIMs, writing a second record of the table to second location of a second FIM of the plurality of FIMS, updating a first entry of the jumboblock list with the first location and a second entry of the jumboblock list with the second location, and updating the table list with a reference to the first location of the jumboblock list.

The first entry includes a reference to the second entry. The FM further includes a last memory buffer. The method further includes receiving a third record of the table to the last memory buffer, writing the third record to a third location on a third FIM of the plurality of FIMs, updating a third entry of the jumboblock list with the third location, and updating the second entry to be coupled to the third entry. The FM further includes an available jumboblock list that includes at least one available location of a FIM of the plurality of FIMs. The method further includes receiving the third location on the third FIM from the available jumboblock list. The first location and second location include sequential block addresses of the first FIM and second FIM. The method further includes reading the first record and second record in parallel. The FM further includes an available blocks list that includes a list of an available block of each of the plurality of FIMs. The method further includes providing a third location of a third FIM for receiving a third record of the table. The third location includes a sequential block reference on the third FIM relative to the second location of the second FIM.

In another embodiment, a controller for a data storage device is disclosed, that includes an I/O to one or more memory devices, and a processor configured to execute a method for database record management. In embodiments the method includes storing a first reference to a first memory location of a first flash interface module (FIM), storing a second reference to a second memory location of a second FIM, wherein the first reference is coupled to the second reference, receiving an indication that data at one of the first memory location and second memory location has been modified, creating a gap in data, and storing a first gap reference to the gap in data.

The first reference is updated to include the first gap reference. The method further includes receiving a request for the first and second reference. The method further includes providing data from the first memory location that is not referenced by the first gap reference. The controller further includes a plurality of references to a plurality of memory locations of a plurality of FIMs. The first reference, second reference, and plurality of references are coupled as a linked list. The at least one additional gap reference is coupled to one of the plurality of references. The method further includes performing a garbage collection on the first gap references and the at least one additional gap reference. The garbage collection is performed when the first gap reference and at least one additional gap reference references at least 20% of memory referenced by the first reference, second reference, and plurality of references.

In another embodiment, a system for storing data is disclosed that includes a front-end (FE) means, a front-end module (FM) means comprising a table list and an available blocks list, and a data block list, the available blocks list comprising a plurality of reference means to a plurality of locations on one or more flash interface modules (FIMs), and a controller means configured to perform a method for database record management. The method includes receiving a table comprising records, updating the table list to reference the table, receiving a plurality of records from the table, updating a FIM with data from a record of the plurality of records, and updating the data block list to include a reference to a memory location on the FIM comprising the data from the record.

The system further includes updating additional FIMs with data from additional records from the plurality of records such that reading data from the FIM and additional FIMs will cause the data from the record and data from additional records to be read in parallel. The method further includes providing a reference to a last buffer that includes a reference memory location in a random access memory (RAM).

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a front-end (FE);
   a front-end module (FM) comprising a plurality of flash interface modules (FIMs), a table list and a jumboblock list, the FM coupled to the FE; and
   a controller comprising a processor configured to perform a method for database record management, the method comprising:
   writing a first record of a table to a first location on a first FIM of the plurality of FIMs;
   writing a second record of the table to a second location of a second FIM of the plurality of FIMs, wherein the second record comprises one or more gaps resulting from data modifications and wherein records of the table are stored across multiple FIMs such that a group of records can be read in parallel;
   updating a first entry of the jumboblock list with the first location and a second entry of the jumboblock list with the second location; and
   updating the table list with a reference to the first location of the jumboblock list.

2. The data storage device of claim 1, wherein the first entry comprises a reference to the second entry.

3. The data storage device of claim 2, wherein the FM further comprises a last memory buffer, the method further comprising:
   receiving a third record of the table to the last memory buffer;
   writing the third record to a third location on a third FIM of the plurality of FIMs;
   updating a third entry of the jumboblock list with the third location; and
   updating the second entry to be coupled to the third entry.

4. The data storage device of claim 3, wherein the FM further comprises an available jumboblock list comprising at least one available location of a FIM of the plurality of FIMs, the method further comprising receiving the third location on the third FIM from the available jumboblock list.

5. The data storage device of claim 1, wherein the first location and second location comprise sequential block addresses of the first FIM and second FIM.

6. The data storage device of claim 5, wherein the method further comprises reading the first record and second record in parallel.

7. The data storage device of claim 6, wherein the FM further comprises an available blocks list comprising a list of an available block of each of the plurality of FIMs.

8. The data storage device of claim 7, wherein the method further comprises providing a third location of a third FIM for receiving a third record of the table, wherein the third location comprises a sequential block reference on the third FIM relative to the second location of the second FIM.

9. A controller for a data storage device, comprising:
   an I/O to one or more memory devices; and
   a processor configured to execute a method for database record management, the method comprising:
   storing a first reference of a first memory location of a first flash interface module (FIM);
   storing a second reference of a second memory location of a second FIM, wherein the first reference is coupled to the second reference and wherein the first and second references being coupled allow for parallel reads of memory locations of the first and second FIMs;
   receiving an indication that data at one of the first memory location or second memory location has been modified, creating a gap in data; and
   storing a first gap reference to the gap in data.

10. The controller of claim 9, wherein the first reference is updated to include the first gap reference.

11. The controller of claim 10, wherein the method further comprises receiving a request for the first and second reference.

12. The controller of claim 11, wherein the method further comprises providing data from the first memory location, that is not referenced by the first gap reference.

13. The controller of claim 9, further comprising a plurality of references to a plurality of memory locations of a plurality of FIMs.

14. The controller of claim 13, wherein the first reference, second reference, and plurality of references are coupled as a linked list.

15. The controller of claim 14, wherein at least one additional gap reference is coupled to one of the plurality of references.

16. The controller of claim 15, wherein the method further comprises performing a garbage collection on the first gap references and the at least one additional gap reference.

17. A controller for a data storage device, comprising:
an I/O to one or more memory devices;
a processor configured to execute a method for database record management, the method comprising:
  storing a first reference to a first memory location of a first flash interface module (FIM);
  storing a second reference to a second memory location of a second FIM, wherein the first reference is coupled to the second reference;
  receiving an indication that data at one of the first memory location and second memory location has been modified, creating a gap in data;
  storing a first gap reference to the gap in data; and
  performing a garbage collection on the first gap references and at least one additional gap reference, wherein the garbage collection is performed when the first gap reference and at least one additional gap reference references at least 20% of memory referenced by the first reference, second reference, and plurality of references; and
a plurality of references to a plurality of memory locations of a plurality of FIMs, wherein the first reference, second reference, and plurality of references are coupled as a linked list, and wherein the at least one additional gap reference is coupled to one of the plurality of references.

18. A system for storing data, comprising:
a front-end (FE) means;
a front-end module (FM) means comprising a table list and an available blocks list, and a data block list, the available blocks list comprising a plurality of references to a plurality of locations on one or more flash interface modules (FIMs), wherein the available blocks list allows for parallel reads of a plurality of locations on one or more FIMs; and
a controller means configured to perform a method for database record management, the method comprising:
  receiving a table comprising records;
  updating the table list to reference the table;
  receiving a plurality of records from the table;
  updating a first FIM with data from a first record of the plurality of records;
  updating a second FIM with data from a second record of the plurality of records, wherein the second record contains gaps resulting from data modification; and
  updating the data block list to include references to memory locations on the first and second FIMs comprising the data from the first and second records.

19. The system of claim 18, further comprising:
updating additional FIMs with data from additional records from the plurality of records such that reading data from the first and second FIMs and additional FIMs will cause the data from the first and second records and data from additional records to be read in parallel.

20. The system of claim 18, wherein the method further comprises providing a reference to a last buffer comprising a reference memory location in a random access memory (RAM).

* * * * *